United States Patent
Ghazali et al.

(10) Patent No.: US 10,380,459 B2
(45) Date of Patent: Aug. 13, 2019

(54) SYSTEM AND METHOD FOR IMAGE CLASSIFICATION

(71) Applicant: IMAGRY (ISRAEL) LTD., Haifa (IL)

(72) Inventors: Adham Ghazali, Haifa (IL); Majed Jubeh, Jerusalem (IL)

(73) Assignee: IMAGRY (ISRAEL) LTD., Haifa (IL)

( * ) Notice: Subject to any disclaimer, the term of this patent is extended or adjusted under 35 U.S.C. 154(b) by 0 days.

(21) Appl. No.: 15/250,973

(22) Filed: Aug. 30, 2016

(65) Prior Publication Data

US 2018/0060699 A1    Mar. 1, 2018

(51) Int. Cl.
*G06K 9/00* (2006.01)
*G06K 9/62* (2006.01)

(52) U.S. Cl.
CPC ........ *G06K 9/6267* (2013.01); *G06K 9/00624* (2013.01); *G06K 9/628* (2013.01)

(58) Field of Classification Search
CPC .. G06K 9/6255; G06K 9/6256; G06K 9/6257; G06K 9/6259; G06K 9/6267; G06K 9/00624; G06K 9/628; G06K 9/6219; G06K 9/627; G06K 9/6271; G06K 9/78; G06F 16/55; G06F 16/50
USPC .......................................................... 382/224
See application file for complete search history.

(56) References Cited

U.S. PATENT DOCUMENTS

| | | | | |
|---|---|---|---|---|
| 2005/0185060 A1* | 8/2005 | Neven, Sr. | ......... | H04N 1/00204 348/211.2 |
| 2011/0295829 A1* | 12/2011 | Boncyk | .................. | G06Q 20/10 707/706 |
| 2015/0169952 A1* | 6/2015 | O'Malley | ......... | G06F 17/30244 382/225 |
| 2015/0170006 A1* | 6/2015 | Cohen | ............... | G06F 17/30247 382/180 |
| 2016/0379091 A1* | 12/2016 | Lin | .................... | G06K 9/00724 382/156 |

OTHER PUBLICATIONS

Farhadi, Ali, et al. "Describing objects by their attributes." Computer Vision and Pattern Recognition, 2009. CVPR 2009. IEEE Conference on. IEEE, 2009.*

(Continued)

*Primary Examiner* — Geoffrey E Summers
(74) *Attorney, Agent, or Firm* — Pearl Cohen Zedek Latzer Baratz LLP (57) ABSTRACT

A system and method of image classification may include linking between a plurality of predetermined objects and categories, assigning a set of attributes for each object until relationships between all categories are determined, storing at least one classified image for each object in an object database, receiving an unclassified image, comparing the received unclassified image to the at least one classified image, determining at least one attribute of the received unclassified image, based on the comparison and based on the assigned attributes for each object, assigning a classification of the received unclassified image, with correlation between the at least one determined attribute of the received unclassified image, and relationships between the categories.

20 Claims, 5 Drawing Sheets

(56) References Cited

OTHER PUBLICATIONS

Sharif Razavian, Ali, et al. "CNN features off-the-shelf: an astounding baseline for recognition." Proceedings of the IEEE conference on computer vision and pattern recognition workshops. 2014.*

Minnaar, Alex. "Deep Learning Basics: Neural Networks, Backpropagation and Stochastic Gradient Descent." Feb. 14, 2015. Web. Accessed Dec. 7, 2017.*

Steinberg, Dan. "Why Data Scientists Split Data into Train and Test." Salford Systems, Mar. 3, 2014. Web. Accessed Dec. 7, 2017.*

Brownlee, Jason. "Gradient Descent for Machine Learning." Machine Learning Mastery, Mar. 23, 2016. Web. Accessed Dec. 7, 2017.*

Deng, Jia, et al. "Imagenet: A large-scale hierarchical image database." Computer Vision and Pattern Recognition, 2009. CVPR 2009. IEEE Conference on. Ieee, 2009. (Year: 2009).*

Deng, Jia, Alexander C. Berg, and Li Fei-Fei. "Hierarchical semantic indexing for large scale image retrieval." Computer Vision and Pattern Recognition (CVPR), 2011 IEEE Conference on. IEEE, 2011. (Year: 2011).*

Russakovsky, Olga, and Li Fei-Fei. "Attribute learning in large-scale datasets." European Conference on Computer Vision. Springer, Berlin, Heidelberg, 2010. (Year: 2010).*

Föckler, Paul, et al. "PhoneGuide: museum guidance supported by on-device object recognition on mobile phones." Proceedings of the 4th international conference on Mobile and ubiquitous multimedia. ACM, 2005. (Year: 2005).*

\* cited by examiner

SYSTEM AND METHOD FOR IMAGE CLASSIFICATION

FIELD OF THE INVENTION

The present invention relates to image classification. More particularly, the present invention relates to systems and methods for processing and categorizing an image taken with an imager.

BACKGROUND OF THE INVENTION

Image identification is usually carried out with image processing of a given image, the image processing based on a collection of image databases. The image can be initially scanned for known patterns, for example taken from a pattern database (e.g., with patterns for cars, horses, etc.), and these patterns can then be compared to the image to identify the object in that image.

With various improvements in computer technology in recent years, different applications can require image identification, however such identification usually requires large computing resources and/or large periods of time to process.

SUMMARY OF THE INVENTION

There is thus provided, in accordance with some embodiments of the invention, a method of image classification, the method including linking, by a processor, between a plurality of predetermined objects and categories, such that each object corresponds to at least one category, assigning, based on the output of a categorization algorithm, a set of attributes for each object until relationships between all categories are determined, wherein at least one predetermined attribute of each object relates to at least one category, storing at least one classified image for each object in an object database, wherein each classified image corresponds to at least one predetermined attribute, receiving an unclassified image, comparing, by the processor, the received unclassified image to the at least one classified image, determining, by the processor, at least one attribute of the received unclassified image, based on the comparison and based on the assigned attributes for each object, assigning, by the processor, a classification to the received unclassified image, based on the output of the categorization algorithm, correlation between the at least one determined attribute of the received unclassified image, and relationships between the categories, and displaying the assigned classification. In some embodiments, the categorization algorithm, when executed by a processor, causes the processor to process received unclassified images and classify the images to categories, the classification algorithm having been trained on classified images and objects from the objects database.

In some embodiments, the method further includes creating, by a processor, a set of classification categories, wherein each category is related to at least one other category.

In some embodiments, the classification assigning is based on contextual relationships between different categories. In some embodiments, the categorization algorithm when executed by the processor causes the processor to train for the set of categories using backpropagation to output the names of each category. In some embodiments, the categorization algorithm when executed by the processor causes the processor to test the categorization for a random set of data.

In some embodiments, the linking includes providing a plurality of queries for a particular object, and wherein each query relates to a particular attribute of the object such that queries for a particular object correspond to at least one category.

In some embodiments, training the categorization algorithm includes providing at least one image, with at least one object, processing the at least one image, receiving categorization results, and adjusting categories based on the categorization results. In some embodiments, the training is carried out with a neural network, and wherein new categories add new nodes to the neural network.

In some embodiments, the method further includes automatically adding at least one category to the set of categories upon detection of a new attribute that does not correspond to existing categories. In some embodiments, the method further includes retraining the categorization algorithm based on a reinforcement mechanism, wherein the reinforcement mechanism includes objects that are similar to the plurality of predetermined objects. In some embodiments, the method further includes receiving feedback from a user during the training.

In some embodiments, the method further includes at least one of providing a predetermined value for a correct identification, and providing a predetermined value for an incorrect identification. In some embodiments, the method further includes automatically gathering additional objects from an external source in order to allow retraining the categorization algorithm with these additional objects. In some embodiments, the method further includes selecting, from a predefined template, the required computing processors needed for the size of the set of classification categories.

In some embodiments, the training includes back propagation algorithm such that at least two attributes of each object are propagated throughout the categorization algorithm. In some embodiments, the method further includes modifying existing categories, with a processor, to fit attributes of newly added objects from the plurality of predetermined objects.

There is also provided, in accordance with some embodiments of the invention, a system for image classification, the system including an imager, configured to receive an unclassified image, a memory module, configured to allow storage of the received unclassified images, an object database, including a set of classified images and predetermined objects corresponding to a set of predefined classification categories, and a processor, configured to allow image identification on received unclassified images based on the classification categories of the object database. According to some embodiments, the image identification is also based on contextual relationships between different categories.

In some embodiments, the image recognition engine includes a plurality of processors. In some embodiments, the system further includes at least one neural network corresponding to a particular object, wherein each neural network includes at least one processor. In some embodiments, the imager, the memory module and the image recognition engine are embedded into a computerized device. In some embodiments, the computerized device is selected from a group consisting of: mobile phone, tablet, and PC.

There is also provided, in accordance with some embodiments of the invention, a method of image classification, the method including linking, by a processor, relationships between a plurality of attributes, predetermined objects and categories, such that each object corresponds to at least one category, wherein at least one attribute of each object relates to at least one category, storing at least one classified image for each object in an object database, wherein each classified image corresponds to at least one attribute, receiving an unclassified image, determining, by the processor, at least one attribute of the received unclassified image, based on comparison of the received unclassified image to the at least one classified image, and based on the assigned attributes for each object, assigning, by the processor, a classification to the received unclassified image, based on correlation between the at least one determined attribute of the received unclassified image, and relationships between the categories, and displaying the assigned classification.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanying drawings in which:

It will be appreciated that for simplicity and clarity of illustration, elements shown in the figures have not necessarily been drawn to scale. For example, the dimensions of some of the elements can be exaggerated relative to other elements for clarity, or several physical components may be included in one functional block or element. Further, where considered appropriate, reference numerals can be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

According to various embodiments of the invention, systems and methods for image classification are described. Initially an automatic corpus may collect description from various databases to create category and/or object databases. For instance for the object 'cat' a system and method may automatically collect a definition for the term 'cat' with links to attributes of that object (e.g., a definition of cat links cat to fur, ears, four legs etc.). Then, a crawler may automatically collect images corresponding to that object, for example collecting images for cat's tail (e.g., from a Google™ images web search, where text inputs produce image outputs).

After initial collection of data, an embodiment of the invention may be trained to link images to objects and/or attributes of objects so as to allow future identification of these objects in newly received images. For instance, one embodiment may include feeding a categorization algorithm with numerous images of chairs as backpropagation training to later identify a chair in a new image. Thus, once a new image is received (e.g., from a camera or from a database) the categorization algorithm may identify objects in that image based on determined attributes of these objects. For example, on receiving a new image of a dog, the system may identify attributes of a dog in that image based on previous training where identification of fur, dog's tail, and ears are possible since the system is already trained to link images of e.g. dog's ears with the category of dogs.

Figure 1A:
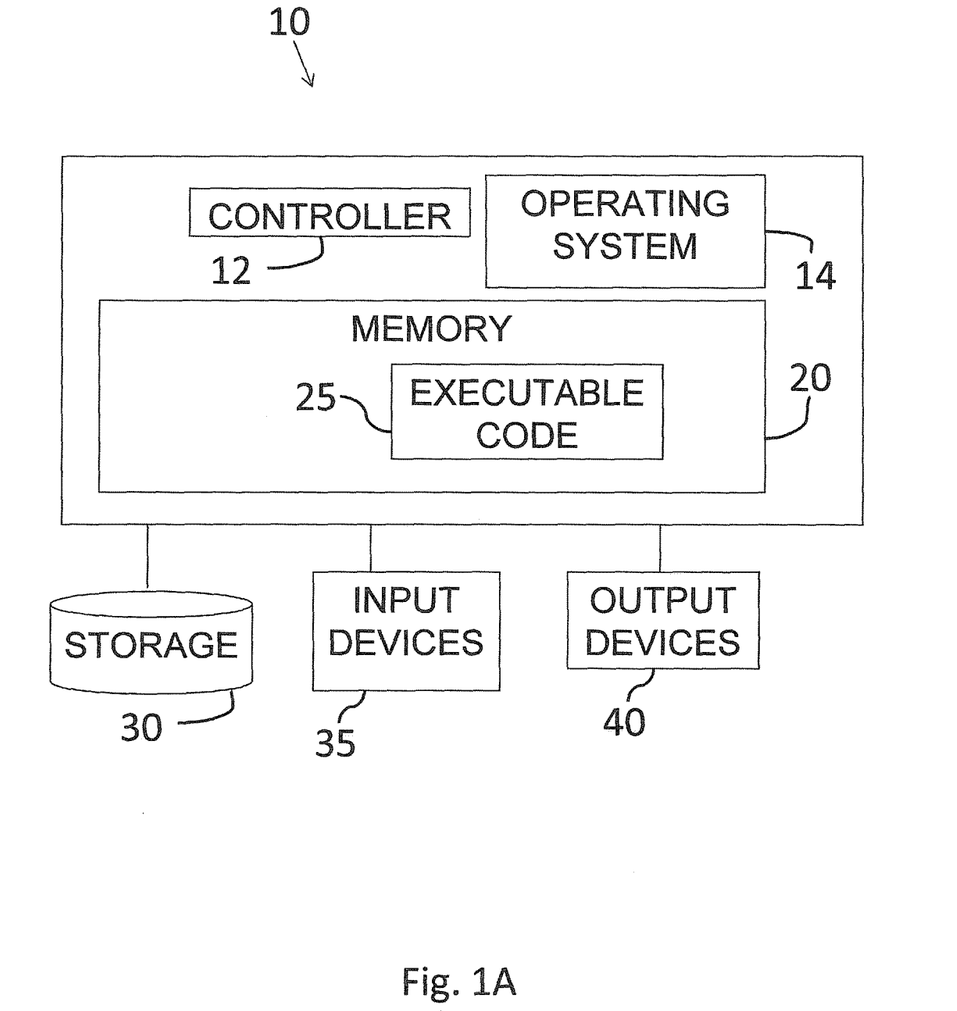
FIG. 1A shows a block diagram of an exemplary computing device, according to an embodiment of the present invention.

Reference is now made to FIG. 1A, which shows a block diagram of an exemplary computing device 10, according to some embodiments of the invention. Computing device 10 may include a controller 12 that may be, for example, a central processing unit processor (CPU), a chip or any suitable computing or computational device, an operating system 14, a memory 20, a storage 30, at least one input device 35 and at least one output devices 40.

Operating system 14 may be or may include any code segment designed and/or configured to perform tasks involving coordination, scheduling, arbitration, supervising, controlling or otherwise managing operation of computing device 10, for example, scheduling execution of programs. Operating system 14 may be a commercial operating system. Memory 20 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 20 may be or may include a plurality of, possibly different memory units.

Executable code 25 may be any executable code, e.g., an application, a program, a process, task or script. Executable code 25 may be executed by controller 12 possibly under control of operating system 14. For example, executable code 25 may be an application for image classification. Where applicable, executable code 25 may carry out operations described herein in real-time. Computing device 10 and executable code 25 may be configured to update, process and/or act upon information at the same rate the information, or a relevant event, are received. In some embodiments, more than one computing device 10 may be used. For example, a plurality of computing devices that include components similar to those included in computing device 10 may be connected to a network and used as a system. For example, image classification may be performed in real-time by executable code 25 when executed on one or more computing devices such as computing device 10.

Storage 30 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 30 and may be loaded from storage 30 into memory 20 where it may be processed by controller 12. In some embodiments, some of the components shown in FIG. 1A may be omitted. For example, memory 20 may be a non-volatile memory having the storage capacity of storage 30. Accordingly, although shown as a separate component, storage 30 may be embedded or included in memory 20.

Input devices 35 may be or may include a mouse, a keyboard, a touch screen or pad or any suitable input device. It will be recognized that any suitable number of input devices may be operatively connected to computing device 10 as shown by block 35. Output devices 40 may include one or more displays, speakers and/or any other suitable output devices. It will be recognized that any suitable number of output devices may be operatively connected to computing device 10 as shown by block 40. Any applicable input/output (I/O) devices may be connected to computing device 10 as shown by blocks 35 and 40. For example, a wired or wireless network interface card (NIC), a modem, printer or facsimile machine, a universal serial bus (USB) device or external hard drive may be included in input devices 35 and/or output devices 40.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 20, computer-executable instructions such as executable code 25 and a controller such as controller 12.

The non-transitory storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Figure 1B:
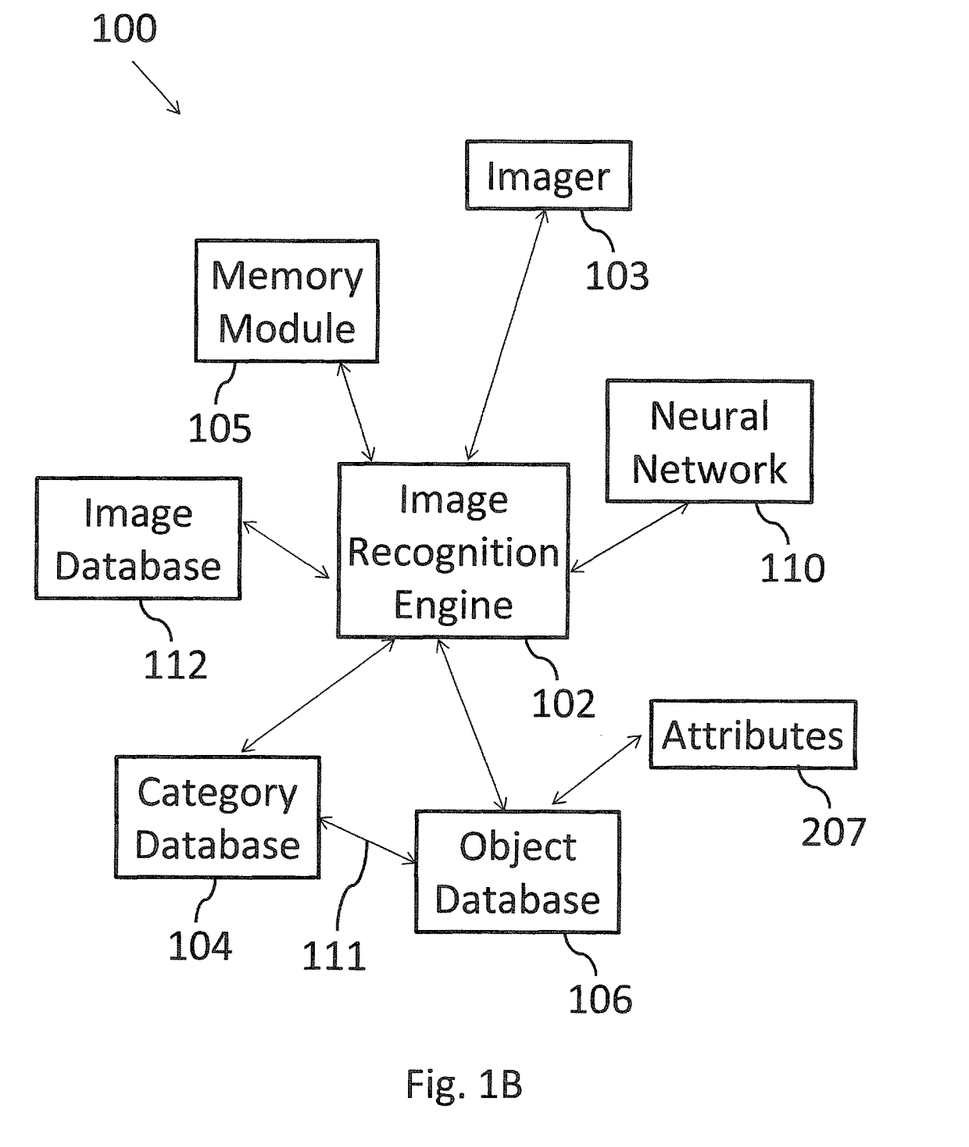
FIG. 1B shows a block diagram of an image classification system, according to an embodiment of the present invention.

Reference is now made to FIG. 1B, which shows a block diagram of an image classification system 100, according to some embodiments of the invention. It is noted that the direction of arrows may indicate the direction of information flow in FIG. 1B.

According to some embodiments, image classification system 100 may include an image recognition engine 102, configured to allow image identification on received images. In some embodiments, image recognition engine 102 may include a plurality of processors. The image recognition, for example as carried out by image recognition engine 102, may be based on the classification categories of at least one of categories of category database 104 and/or object database 106. In some embodiments, object database 106 may include a set of predetermined objects corresponding to a set of predefined classification categories stored at category database 104. In some embodiments, the image identification may be also based on contextual relationships 111 between different categories and/or objects, as further described hereinafter.

In some embodiments, at least one predefined classification category from category database 104 may be collected automatically with an automatic image crawler, that may search for tags and text descriptions in random databases, e.g., in random Internet web-pages. For example, an image crawler may automatically collect images for a particular object (e.g., for a chair) from Internet databases (e.g., from Google™ images web search).

In some embodiments, at least two predefined classification categories may be required in order to perform image classification. In some embodiments, an automatic corpus may derive language description for a particular category and/or object from various sources (e.g., from web pages and/or predefined databases).

According to some embodiments, image classification system 100 may further include an imager 103, configured to allow capturing and/or receiving an image of an object, for example capturing an image with a camera of a smartphone or receiving an image from a predefined database. In some embodiments, image classification system 100 may further include a memory module 105 (e.g., corresponding to storage 30 or memory 20), configured to allow storage of at least one of the received images, for instance received by imager 103, and/or predefined classification categories, for instance from category database 104, and/or objects, for instance from object database 106.

In some embodiments, image classification system 100 may further include at least one neural network 110, for instance implemented by image recognition engine 102, the neural network 110 corresponding to a particular object, wherein each neural network 110 may include a plurality of processors. In some embodiments, at least one of imager 103 and/or memory module 105 and/or image recognition engine 102 may be embedded into a computerized device, for instance embedded into a mobile phone, and/or a tablet computer and/or a personal computer (PC).

In some embodiments, neural networks may be changed or evolved by retraining them from time to time based on a reinforcement mechanism, whereby the relationships may be used to form concepts and visual relationships between different objects.

It may be appreciated that various components such as image recognition engine 102, imager 103, category database 104, object database 106, memory module 105 and neural network 110 may include components such as shown in FIG. 1A, and may be configured to carry out embodiments of the invention by for example executing (or having a processor execute) code or software, and/or by including dedicated code.

Figure 2:
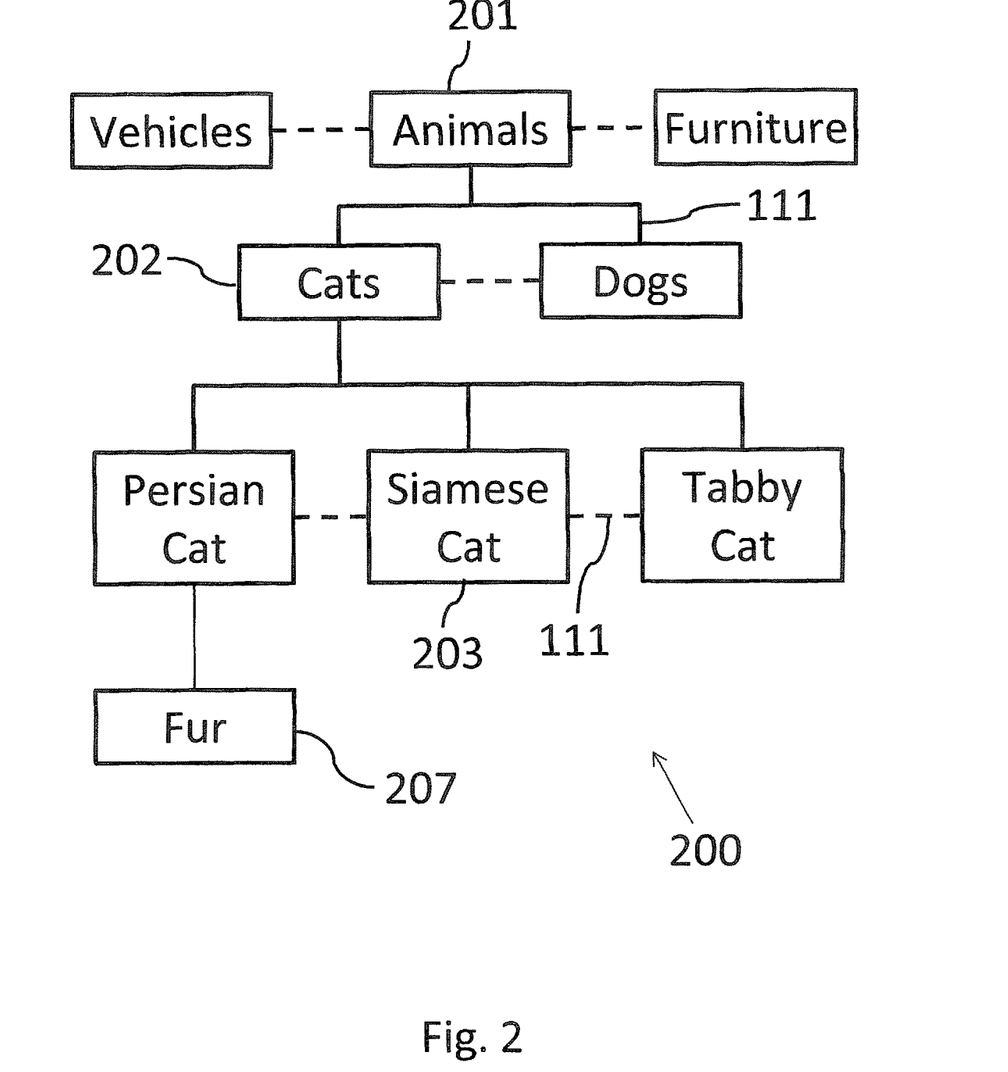
FIG. 2 shows exemplary hierarchical relationships between classification categories, according to an embodiment of the present invention.

Reference is now made to FIG. 2, which shows exemplary hierarchical relationships between classification categories, according to some embodiments of the invention. It may be appreciated that FIG. 2 shows a map 200 of relationships 111 between different classification categories. Category database 104 may include predefined parent classification categories 201, for example vehicles and animals. Each parent category 201 may include a first child classification category 202, for example cats and dogs, that may in turn also include a second child classification category 203 including at least one object, for example a Persian cat or Siamese cat. Each child classification category 203 may be linked to at least one attribute 207 for a corresponding object. For example category Persian cat 203 may have the attribute 207 of fur. It is noted that dashed lines may indicate sibling relationships in FIG. 2.

In some embodiments, each category 203 and/or object and/or attribute 207 may have or be assigned a corresponding neural network 110. For example, a neural network 110 for a 'dog's tail' attribute 207 may be configured to identify dog's tail in a received image.

According to some embodiments, attributes 207 for each object, for instance attributes describing objects (e.g., tall or short) in object database 106, may be collected based on hierarchical relationships of previously determined categories, for example in category database 104. It may be appreciated that an attribute may refer to a characteristic of an object that may differentiate that object from at least one category compared thereto, for example an attribute of an object having six legs may differentiate that object from the category of cats. In some embodiments, attributes 207 may be stored in object database 106 where at least one attribute 207 corresponds to each object stored therein.

In some embodiments, one or more words or combination of words in dictionary definition of objects may correspond to an attribute or to a category. For example, the dictionary definition of the object 'cat' includes the word 'animal' that may correspond to the category 'animal', and thereby categorize a cat as an animal. In another example, the dictionary definition of cat includes 'four legs' as an attribute such that that attribute excludes cat from the vehicle category for instance. In some embodiments, attributes for an object may be determined manually, for instance during calibration of the categorization system, in case attributes cannot be automatically determined from dictionary definition and other sources for instance. In some embodiments, attributes 207 may be stored in a separate attribute database.

It may be appreciated that some commercially available solutions require human user intervention in order to determine the object identified in an image, with hundreds of working hours spent to identify a particular object (e.g., identifying a tree for car cameras) and automatic identification, for example using image classification system 100, may provide a time saving solution.

It is noted that hierarchical relationships refer to relationships between different categories, for instance on category database 104, such as relationship between parent and child category. In some embodiments, dictionary definitions may be determined for at least one predefined keyword of each category in order to determine contextual relationships between objects and/or categories based on specific keywords from the dictionary definitions. It is noted that a single object, for instance a cat, may correspond to more than one category, where the relationship between the object and categories may be determined with categories to which each object corresponds.

For example, a definition for a Persian cat may be a long-haired breed of cat, a definition for a Siamese cat may be a slender short-haired blue-eyed breed of cat having a pale coat with dark ears paws face and tail tip, and a definition for a tabby cat may be a cat with a grey or tawny coat mottled with black. It is appreciated that in this example, Persian cat, Siamese cat and tabby cat are examples of objects within the category 'cat'. In this example keyword extraction may provide the following: a cat is a type of animal Persian cat: long-haired, Siamese cat: short-haired, and Siamese and Persian cat are two neighboring (or sibling) objects. It is noted that relationship between different categories may also include inheritance of object attributes, where an attribute of a particular category may pass to all child categories. For example, all child categories 203 of "dotted cat" categories, for instance sibling categories with a dashed line therebetween in the map, may have the attribute 207 'dotted', while a parent category 202 'cat' not necessarily includes the attribute 207 'dotted'.

In some embodiments, such keyword extraction may include at least one of removing all stop words from the text (e.g., for, the, are, is, and etc.), and/or creating an array of candidate keywords (which are set of words separated by stop words), and/or finding the frequency of the words (where stemming may be used), and/or finding the degree of the each word (where the degree of a word is the number of times a word is used by other candidate keywords), and/or for every candidate keyword finding the total frequency and degree by summing all word's scores, and/or determining the score for being a keyword from the degree and/or frequency.

It should be appreciated that the image classification system may allow building efficient image recognition engines that may have less memory footprint due to parameter sharing, for example though shared attributes, using less computational resources. Due to the relationships determined between different categories and/or objects, image identification may be achieved quickly and efficiently (e.g., using less computational resources), compared to some commercially available methods where it is necessary to recognize all parameters for identification of a particular object.

Figure 3A:
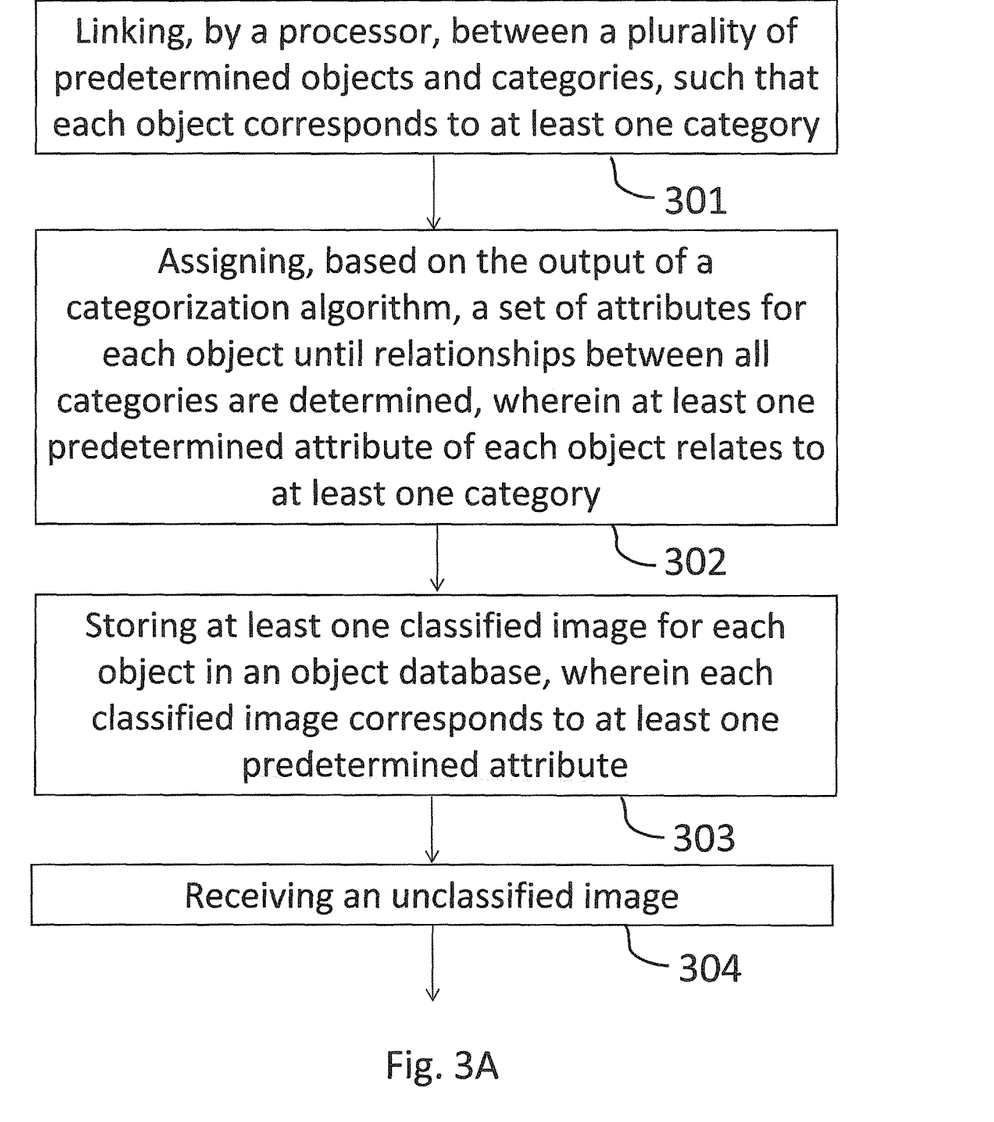
FIG. 3A shows a flow chart for a method of image classification, according to an embodiment of the present invention.
Figure 3B:
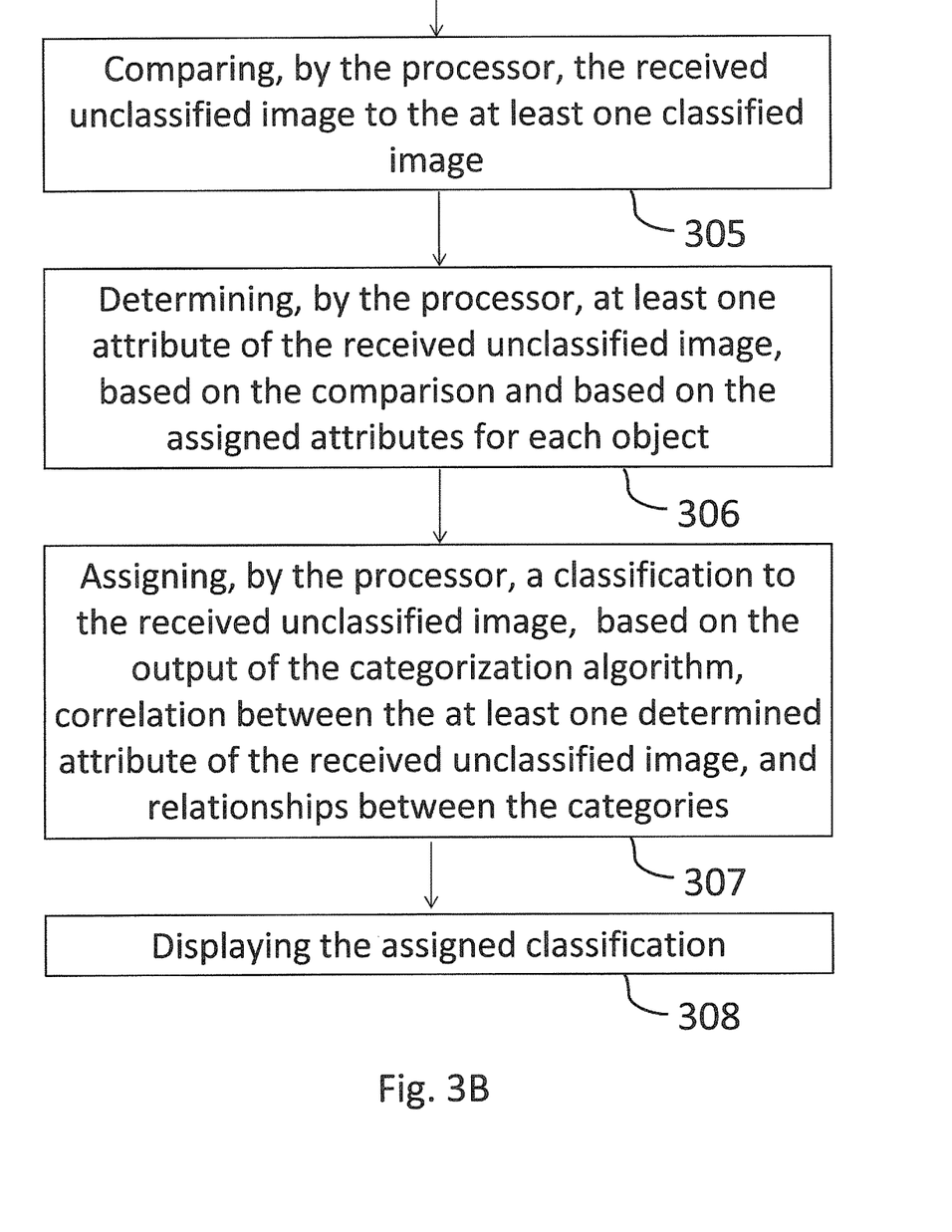
FIG. 3B shows a continuation of the flow chart for a method of image classification, according to an embodiment of the present invention.

Reference is now made to FIGS. 3A-3B, which show a flowchart of a method of image classification, according to some embodiments of the invention. While the computer systems shown in other figures may be used to carry out the operations of FIGS. 3A-3B, other or different systems may be used.

According to some embodiments, a method of image classification may include linking 301, by a processor 102, between a plurality of predetermined objects and categories, such that each object corresponds to at least one category. It may be appreciated that linking may include mapping (e.g. creating links) all relationships 111 between the categories and/or objects such that each category and/or object may be defined in terms of other categories and/or objects, thereby allowing identification of an object based on the category decomposition. For example, linking or performing a category decomposition may include creating links (e.g., stored in category database) between all categories and/or objects such that each category and/or object may be defined in terms of other categories and/or objects based on the links therefrom.

In some embodiments, the method of image classification may further include assigning 302, based on the output of a categorization algorithm, a set of attributes 207 for each object until relationships 111 between all categories are determined, wherein at least one predetermined attribute 207 of each object relates to at least one category. The set of predefined classification categories may be defined prior to performing image classification, for example, by providing a set of basic categories such as vehicles, animals, plants, etc.

In some embodiments, the method of image classification may further include storing 303 at least one classified image for each object, for example in an object database 106, wherein each classified image corresponds to at least one predetermined attribute 207. In some embodiments, the method of image classification may further include receiving 304 an unclassified image (e.g., prior to classification of an object within the image), for example capturing an image with a camera of a smartphone or mobile device or receiving an image from a predefined database.

According to some embodiments, the method of image classification may further include comparing 305, by the processor 102, the received unclassified image to the at least one classified image. In some embodiments, classified images may be stored at a dedicated image database 112 such that it may be possible to compare an unclassified image to classified images, for example using image processing.

In some embodiments, the method of image classification may further include determining 306, by the processor 102, at least one attribute 207 of the received unclassified image, based on the comparison and based on the assigned attributes for each object. It may be appreciated that after training the categorization algorithm to identify attributes of objects in an image using classified images (e.g., specific images for known attributes) a new unclassified image may be compared to stored classified images to determine the attributes.

In some embodiments, the method of image classification may further include assigning 307, by the processor 102, a classification to the received unclassified image, based on the output of the categorization algorithm, correlation between the at least one determined attribute 207 of the received unclassified image, and relationships 111 between the categories. In some embodiments, the method of image classification may further include displaying 308 the assigned classification, for example displaying to the user. In some embodiments, the categorization algorithm, when executed by the processor 102, causes the processor 102 to process received unclassified images and classify the images to categories, the classification algorithm having been trained on classified images and objects from the objects database.

In some embodiments, the method of image classification may further include modifying existing categories, with a processor 102, to fit attributes of newly added objects from the plurality of predetermined objects.

It may be appreciated that the relationship between categories may be determined based on hierarchical category relationship that may be mapped during category decomposition. For example, training may include about 100-1000 iterations of all images in the database. Other numbers of iterations may be used.

It may be appreciated that relationships, e.g., between categories and objects, may be determined based on non-semantic knowledge (e.g., identifying a computer as an electronic device) and/or based on shared attributes that is initially unknown (e.g., a dog and a chair both have four legs). In some embodiments, it may be possible to differentiate between different objects based on the number of relationships created therebetween. For example, more shared attributes may be identified between the categories 'dog' and 'cat' (e.g., four legs, eyes, ears, etc.) than shared attributes identified between the categories 'dog' and 'chair' (e.g., four legs).

In some embodiments, creating a category database and/or object database may be initiated by an automatic corpus (e.g., a text that contains words with text associated to them via links, for example similar in structure to webpage articles such as in "Wikipedia") such that relationships between different categories and/or objects may be stored in a dedicated database. For example, an automatic corpus providing information on vehicles may create an automobile category and a motorcycle category with automatically created relationships between their objects and/or attributes such as number of wheels and headlights. Then, for each word in the corpus a set of images may be collected through for example web crawlers or received from images stored on a separate image database 112 (e.g., automatically collecting images for wheels). In some embodiments, during training the collected set of images may be provided to the categorization algorithm such that each category and/or object and/or attribute may be linked to at least one image.

It should be appreciated that after performing training of the categorization algorithm, a newly received image may be categorized based on previously determined attributes of objects and/or previously collected images linked thereto. For example, performing image identification on an image of a dog and collecting different attributes (e.g., ears, tail, and four legs) corresponding to previously determined categories and/or objects where the category for dogs is linked to dog attributes (e.g., fur, tail, etc.), as well as linked to dog images, and correlation of attributes may allow identification of the object in the received image. For example, in a received image of a dog, the attribute of 'legs' may be identified (e.g., with a neural network) based on comparison to stored image data from previous training, where the category of 'dog' is linked to attribute of 'legs' and multiple images of dog legs are automatically collected for training to identify the legs. In some embodiments, the number of links or determined attributes may also assist in identification, for example both 'chair' and 'dog' have four legs, but in a received image of a dog there may be more shared attributed with the 'dog' category' (and corresponding previously stored dog images) than the 'chair' category (and corresponding previously stored chair images).

According to some embodiments, the categorization algorithm may include training for the set of categories using backpropagation to output the names of each category, where a set of objects all belonging to the same category may be provided as input to determine the required category. In some embodiments, the categorization algorithm may further include testing the categorization for a random set of data. In some embodiments, the category decomposition may further include providing a plurality of queries for a particular object, wherein each query may relate to a particular attribute of the object such that queries for a particular object may correspond to at least one category. In some embodiments, the queries may be directly created from a language dataset (e.g., with contextual relationships). It may be appreciated that an image may be considered as a query for the system, where the output may be an object corresponding to that image.

According to some embodiments, training the categorization algorithm may include at least one of providing at least one image, with at least one object, and/or processing the at least one image, and/or receiving categorization results. It may be appreciated that processing the at least one image may include applying the categorization algorithm onto the image by the processor to identify at least one attribute of an object and thereby classify the object. For example, identify dog's legs and tail and classify the image to 'dog' category. In some embodiments, the training may be carried out with a neural network with each category and/or object represented by a node in the neural network, and new categories may add new nodes to the neural network. In some embodiments, the categorization algorithm may include a convolution neural network (CNN).

According to some embodiments, the image classification method (e.g., as shown in FIGS. 3A-3B) may further include automatically adding at least one category to the set of categories upon detection of a new attribute that does not correspond to existing categories. In some embodiments, the image classification method (e.g., as shown in FIGS. 3A-3B) may further include retraining the categorization algorithm based on a reinforcement mechanism with several iterations, wherein the reinforcement mechanism may include objects that are similar to the plurality of predetermined objects. In some embodiments, the image classification method may further include receiving feedback from a user, via an input device such as a keyboard, a touchscreen, a mouse, a button, a knob or any other input device known in the art, during the training.

In some embodiments, the image classification method may further include providing a predetermined value for a correct identification, and/or providing a predetermined value for an incorrect identification. In some embodiments, the image classification method may further include automatically gathering additional objects from an external source in order to allow retraining the categorization algorithm with these additional objects. In some embodiments, the image classification method may further include selecting, from a predefined template, the required computing processors needed for the size of the set of classification categories.

In some embodiments, the training may include backpropagation algorithm such that at least two attributes of each object are propagated throughout the categorization algorithm, where a set of attributes all belonging to the same object may be provided as input to determine the required object.

It may be appreciated that using such a method may allow performing image classification offline, namely without connection to the internet, where the databases required for such classification may be stored on a database of about 10-50 megabytes. Therefore, such a classification method may be carried out on any mobile device (e.g., smartphone and/or tablet) having an imager, a processor and a storage space of about 10-50 megabytes. In some embodiments, a user may input or create an image. For example, a user may direct a camera of a mobile device (configured to implement the image classification method) towards an object and capture an image of that object (or alternatively receive a new image from a database). At least one attribute of the object in the image (e.g., a tail of a dog) may then be identified (e.g., by categorization algorithm run by the processor) until the object is classified, where the identification of the attributes correlate to comparison with previously stored attributes and corresponding classified images. For example, checking other attributes to find the correct classification, e.g. check that the tail belongs to a dog and not a horse using additional attributes (e.g., fur). The final classification of the object may be displayed to the user, e.g. display "dog" on the mobile device.

Unless explicitly stated, the method embodiments described herein are not constrained to a particular order in time or chronological sequence. Additionally, some of the described method elements can be skipped, or they can be repeated, during a sequence of operations of a method.

Various embodiments have been presented. Each of these embodiments can of course include features from other embodiments presented, and embodiments not specifically described can include various features described herein.

The invention claimed is:

1. A method of offline image classification in a mobile device with storage capacity of 10-50 megabytes, the method comprising:
    linking between a plurality of predetermined objects and categories, such that each object corresponds to at least one category;
    assigning, based on an output of a categorization algorithm, a set of attributes for each object until hierarchical relationships between all categories are determined, wherein at least one predetermined attribute of each object relates to at least one category;
    storing at least one classified image for each object in an object database on the mobile device, wherein each classified image corresponds to at least one predetermined attribute;
    capturing an unclassified image, by an imager of the mobile device;
    comparing, by a processor of the mobile device, the captured unclassified image to the at least one classified image, wherein the comparing is carried out offline;
    determining, by the processor, at least one attribute of the captured unclassified image, based on the comparison and based on the assigned attributes for each object, wherein the determining is carried out offline;
    assigning, by the processor, a classification to the captured unclassified image, based on: the output of the categorization algorithm, the at least one determined attribute, and the determined hierarchical relationships between the categories, wherein the assigning is carried out offline; and
    displaying the assigned classification,
    wherein the categorization algorithm, when executed by the processor, causes the processor to process captured unclassified images and classify the images to categories, the classification algorithm having been trained on classified images and objects from the object database.

2. The method of claim , further comprising creating, by the processor, a set of classification categories, wherein each classification category is related to at least one other classification category.

3. The method of claim 1, wherein the classification assigning is also based on contextual relationships between different categories.

4. The method of claim 3, wherein the categorization algorithm tests the categorization for a random set of data.

5. The method of claim 1, wherein the categorization algorithm trains for the set of categories using backpropagation to output the names of each category.

6. The method of claim 1, wherein the linking comprises providing a plurality of queries for a predetermined object, and wherein each query relates to a predetermined attribute of that object such that queries for the predetermined object correspond to at least one category.

7. The t method of claim 1, wherein training the categorization algorithm comprises:
   providing at least one image, with at least one object;
   processing the at least one image;
   receiving categorization results; and
   adjusting categories based on the categorization results.

8. The method of claim 1, wherein the training is carried out with a neural network, and wherein new categories add new nodes to the neural network.

9. The method of claim 8, wherein at least one neural network corresponds to a predetermined object.

10. The method of claim 1, further comprising automatically adding at least one category to the set of categories upon detection of a new attribute that does not correspond to existing categories.

11. The method of claim 10, further comprising receiving feedback from a user during the training.

12. The method of claim 10, further comprising at least one of providing a predetermined value for a correct identification, and providing a predetermined value for an incorrect identification.

13. The method of claim 1, further comprising retraining the categorization algorithm based on a reinforcement mechanism, wherein the reinforcement mechanism comprises objects that are similar to the plurality of predetermined objects.

14. The method of claim 1, further comprising automatically gathering additional objects from an external source in order to allow retraining the categorization algorithm with the additional objects.

15. The method of claim 1, further comprising selecting, from a predefined template, computing processors that are needed for the size of the set of classification categories.

16. The method of claim 1, wherein the training comprises a back propagation algorithm such that at least two attributes of each object are propagated throughout the categorization algorithm.

17. The method of claim 1, further comprising modifying existing categories, with a processor, to fit attributes of objects from the plurality of predetermined objects.

18. The method of claim 1, wherein relationships between all categories are determined based on non-semantic knowledge.

19. The method of claim 1, wherein assigning a classification to the captured unclassified image is also based on categories with the highest number of relationships.

20. A method of offline image classification in a mobile device with storage capacity of 10-50 megabytes, the method comprising:
   linking hierarchical relationships between a plurality of attributes, predetermined objects and categories, such that each object corresponds to at least one category, wherein at least one attribute of each object relates to at least one category;
   storing at least one classified image for each object in an object database on the mobile device, wherein each classified image corresponds to at least one attribute;
   capturing an unclassified image, by an imager of the mobile device;
   determining, by a processor of the mobile device, at least one attribute of the captured unclassified image, based on comparison of the captured unclassified image to the at least one classified image, and based on the linked attributes for each object, wherein the determining is carried out offline;
   assigning, by the processor, a classification to the captured unclassified image, based on the at least one determined attribute, and the hierarchical relationships between the categories, wherein the assigning is carried out offline; and
   displaying the assigned classification.

\* \* \* \* \*